(12) United States Patent
Masumoto

(10) Patent No.: US 8,450,432 B2
(45) Date of Patent: May 28, 2013

(54) POLYURETHANE ELASTOMER COMPOSITION FOR ELECTROPHOTOGRAPHIC PRINTING AND ELECTROPHOTOGRAPHIC PRINTING MEMBER USING THE SAME

(75) Inventor: Masaya Masumoto, Osaka (JP)

(73) Assignee: DIC Corporation, Tokyo (JP)

( * ) Notice: Subject to any disclaimer, the term of this patent is extended or adjusted under 35 U.S.C. 154(b) by 178 days.

(21) Appl. No.: 12/934,751

(22) PCT Filed: Feb. 18, 2009

(86) PCT No.: PCT/JP2009/052749
§ 371 (c)(1),
(2), (4) Date: Sep. 27, 2010

(87) PCT Pub. No.: WO2009/119189
PCT Pub. Date: Oct. 1, 2009

(65) Prior Publication Data
US 2011/0021721 A1    Jan. 27, 2011

(30) Foreign Application Priority Data
Mar. 28, 2008 (JP) .................... 2008-086281

(51) Int. Cl.
*C08F 20/00* (2006.01)
(52) U.S. Cl.
USPC ...... 525/440.01; 525/437; 525/453; 525/454; 525/85; 525/272; 525/302
(58) Field of Classification Search
USPC .............. 525/437, 440.01, 453, 454, 85, 272, 525/302; 528/85, 272, 302
See application file for complete search history.

(56) References Cited

U.S. PATENT DOCUMENTS
5,510,887 A * 4/1996 Watabe et al. ................ 399/350

FOREIGN PATENT DOCUMENTS

| EP | 0 622 709 A2 | 11/1994 |
|---|---|---|
| JP | 63-008685 A | 1/1988 |
| JP | 03-115418 A | 5/1991 |
| JP | 07-097427 A | 4/1995 |
| JP | 07-179553 A | 7/1995 |
| JP | 2001-083855 A | 3/2001 |
| JP | 3877065 | 4/2003 |
| JP | 2004-220019 A | 8/2004 |
| JP | 2004-292809 A | 10/2004 |
| JP | 3928880 | 7/2005 |
| JP | 2008-033249 A | 2/2008 |

OTHER PUBLICATIONS

Szycher, M.; Szycher's Handbook of Polyurethanes, 1999, p. 3-1, 3-9, and 3-10.*
Supplementary European Search Report for European Patent Application No. 09724226.7 issued Mar. 3, 2011.
International Search Report dated May 19, 2009, issued in PCT/JP2009/052749.

* cited by examiner

*Primary Examiner* — Robert Jones, Jr.
(74) *Attorney, Agent, or Firm* — Edwards Wildman Palmer LLP; James E. Armstrong, IV; Nicholas J. DiCeglie, Jr.

(57) ABSTRACT

The present invention provides a polyurethane elastomer composition for electrophotographic printing, including: a polyester polyol (A) obtained by polycondensing a polyvalent carboxylic acid (A-1) containing sebacic acid as a main component and a polyhydric alcohol (A-2) selected from (I) a linear glycol having 2 to 4 carbon atoms, (II) a linear glycol having 2 to 4 carbon atoms and a glycol having 2 to 4 carbon atoms with an alkyl side chain and (III) a linear glycol having 2 to 4 carbon atoms and 1,6-hexaneglycol; a polyisocyanate compound (B); and a mixture (C) of a short-chain diol and a short-chain triol. The polyurethane elastomer composition for electrophotographic printing has reduced temperature dependency, improved long-term durability and satisfactory mechanical strength. An electrophotographic printing member is also provided.

14 Claims, No Drawings

POLYURETHANE ELASTOMER COMPOSITION FOR ELECTROPHOTOGRAPHIC PRINTING AND ELECTROPHOTOGRAPHIC PRINTING MEMBER USING THE SAME

TECHNICAL FIELD

The present invention relates to a polyurethane elastomer composition having reduced temperature dependency, durability and mechanical strength, and an electrophotographic printing member using the polyurethane elastomer composition.

BACKGROUND ART

In recent years, in the field of electrophotographic printing which is applied to high-speed laser/LED printers, copy machines and multifunctional printers, the specifics of printing machines and toners are changing due to the growing demand for high image quality, speeding up of printing, and energy-saving. With the changes, in the image-forming process in which electric-charging, exposure, image development, transfer, fixing, cleaning and neutralization are repeated, more specifically, in the toner removing process which removes the toner remained on a photoreceptor after transferring toner image, cleaning accuracy becomes more important than ever before.

Especially, in the field of high-speed printing, since the cycle speed of the image-forming process is high, toner is easily slipped through, and thus it is required to certainly remove the remaining toner in a short time. However, since the toner is used for high image quality printing, the processed toner having fine grains is used. Therefore, improvement of durability is required for preventing the toner from slipping through. Furthermore, in high-speed printing, the temperature increases greatly when continuous printing is performed, and in the printing for energy-saving strategy, in order to shorten the start-up time or restart-up time after sleep mode, stability of cleaning performance capable of responding to variations of external temperature is also required.

Until now, in order to reduce the temperature dependency of cleaning performance while keeping an ultralow rebound resilience, a polyurethane elastomer using 1,9-nonane diol, methyl-1,8-octane diol/adipic acid or sebacic acid was used as a polyester polyol wherein Mn=500 to 5000 and ester group concentration=6 to 8 mmol/g. However, in the said composition ratio, the permanent elongation becomes large, and there is a problem in that the long-term durability of the cleaning blade contacting a photoreceptor at the flexural state is inferior (refer to Patent Documents 1 and 2).

Furthermore, a polyurethane elastomer using a polyester diol having an ester group concentration of 6 to 8 mmol/g and an alkyl side chain concentration of 2 to 4 mmol has been proposed. However, when a polyester diol having an alkyl side chain concentration of 2 mmol or more is used, the tensile strength at break and the tear strength of the polyurethane elastomer decrease significantly, and a trouble chipping very small pieces of polyurethane elastomer is caused when the cleaning blade is used for a long time (refer to Patent Document 3).

Patent Document 1: Japanese Examined Patent Application Publication No.
Patent Document 2: Japanese Unexamined Patent Application Publication No. 2004-292809,
Patent Document 3: Japanese Examined Patent Application Publication No. 3877065

DISCLOSURE OF INVENTION

Problems to be Solved by the Invention

The present invention provides a polyurethane elastomer composition capable of obtaining a polyurethane elastomer, which is necessary for an electrophotographic printing member such as cleaning blades capable of being used for high-speed and high-image quality printing, and has an improved long-term durability and satisfactory mechanical strength, and an electrophotographic printing member.

Means for Solving the Problems

Specifically, the present invention provides a polyurethane elastomer composition for electrophotographic printing including: a polyester polyol (A) obtained by polycondensing a polyvalent carboxylic acid (A-1) containing sebacic acid as a main component and a polyhydric alcohol (A-2) selected from the following (I) to (III): (I) a linear glycol having 2 to 4 carbon atoms, (II) a linear glycol having 2 to 4 carbon atoms and a glycol having 2 to 4 carbon atoms with an alkyl side chain, (III) a linear glycol having 2 to 4 carbon atoms and 1,6-hexane diol; a polyisocyanate compound (B); and a mixture (C) of a short-chain diol and a short-chain triol, and an electrophotographic printing member.

Effects of the Invention

According to the present invention, since a polyhydric alcohol containing sebacic acid as a main component and a glycol having 2 to 4 carbon atoms are used, namely, a long-chain carboxylic acid and a short-chain glycol were used together with a glycol having a small amount of side chain, the plastic deformation during elongation can be reduced, thereby making it possible to provide an electrophotographic printing member having a reduced temperature dependency and having both long-term durability and mechanical strength.

BEST MODE FOR CARRYING OUT THE INVENTION

The polyvalent carboxyl acid (A-1) containing sebacic acid as a main component of the present invention is a saturated aliphatic dibasic acid and contains sebacic acid as a main component. The phrase "containing sebacic acid as a main component" indicates that sebacic acid is preferably used in the polyvalent carboxylic acid (A-1) in an amount of 50 to 100 mol %. Examples of other polyvalent carboxylic acid used together with sebacic acid preferably include adipic acid, and the amount used is 0 to 50 mol %. If the amount of adipic acid exceeds 50 mol %, the tan δ temperature dispersion width in the obtained polyurethane elastomer becomes narrow and the fluctuation range of rebound resilience caused by external environment increases. Therefore, it is not preferable. In addition, a small amount of other well-known aliphatic dibasic acids may be used as long as they do not undermine the effects of the present invention.

As for the linear glycol having 2 to 4 carbon atoms (I) used in the present invention, it is desirable to use any two components selected from ethylene glycol, 1,3-propylene glycol and 1,4-butane diol. It is preferable to use ethylene glycol and 1,4-butane diol in combination. In addition, the ratio (mol %)

between ethylene glycol and 1,4-butane diol when using them is ethylene glycol/1,4-butane diol=60 to 80/20 to 40 (mol %). If the ratio is excluded from this range, plastic deformation occurs at elongation and the permanent elongation increases. Therefore, it is not preferable.

As for the glycol having 2 to 4 carbon atoms with an alkyl side chain in (II) used in the present invention, an aliphatic glycol with an alkyl side chain having 1 to 2 carbon atoms is preferable, and 1,2-propylene glycol and 2-methyl-1,3-propane diol are more preferable. The amount used is preferably 20 mol % or less in the polyhydric alcohol (A-2), particularly preferably 20 to 1 mol %. If the amount of the glycol with a side chain is less than 1 mol %, the effect of reducing the permanent elongation in the obtained polyurethane elastomer is not discernible. Therefore, it is not preferable. Meanwhile, if the amount of the glycol with a side chain exceeds 20 mol %, the tensile strength at break in the obtained polyurethane elastomer decreases and troubles chipping very small pieces of polyurethane elastomer occur in the obtained polyurethane elastomer when used continuously. Therefore, it is not preferable. In addition, the linear glycol having 2 to 4 carbon atoms used in (II) may be the same as the glycol used in (I).

The linear glycol having 2 to 4 carbon atoms and 1,6-hexane diol (III) used in the present invention includes the linear glycol described in (I) and 1,6-hexane diol. The ratio (mol %) between the two components is linear glycol/1,6-hexane diol=50 to 90/10 to 50 (mol %). If the ratio is excluded from this range, plastic deformation occurs at elongation and the permanent elongation increases in the obtained polyurethane elastomer. Therefore, it is not preferable.

The polyester polyol (A-2) of the present invention may be produced by polycondensing the polyvalent carboxylic acid (A-1) and at least one polyhydric alcohol (A-2) selected from (I), (II) and (III) at a mole ratio of 1:1.05 to 1.2. The number average molecular weight is preferably 1500 to 3000. If it is excluded from the range, the durability is inferior. In addition, a small amount of other diol compounds and the dibasic acid compounds may be used as long as they do not undermine the effects of the present invention. The ester group concentration of the polyester polyol (A-2) is preferably more than 8 mmol/g since the permanent elongation decreases in the obtained polyurethane elastomer. More preferably, the ester group concentration of the polyester polyol (A-2) is 8 mmol/g to 9 mmol/g.

Examples of the polyisocyanate compound (B) include 2,4-toluene diisocyanate (2,4-TDI), 2,6-toluene diisocyanate (2,6-TDI), 4,4'-diphenyl methane diisocyanate (MDI), paraphenylene diisocyanate (PPDI), 1,5-naphthalene diisocyanate (NDI), 3,3-dimethyl diphenyl-4,4'-diisocyanate (TODI) and the like. Among these compounds, MDI is particularly preferable in terms of the performance.

The mixture (C) of the short-chain diol and the short-chain triol used in the present invention is a cross-linking agent, and it is preferable that short-chain diol/short-chain triol=90/10 to 50/50 (ratio by weight). If the content of the short-chain diol exceeds 90%, it is not preferable because the crosslink density in the obtained polyurethane elastomer decreases and the permanent elongation increases. Meanwhile, if the content of the short-chain triol exceeds 50%, it is not preferable because the glass-transition temperature of the obtained polyurethane elastomer is elevated and the rubber elasticity at normal temperature is inferior. As for the short-chain diol, the same compound as the linear glycol having 2 to 4 carbon atoms (ethylene glycol, 1,4-butane diol, 1,3-propane diol) described above may be used. As for the short-chain triol, triols such as trimethylolethane, trimethylolpropane or glycerol may be used. In the present invention, an alicyclic diol such as cyclohexane diol, cyclohexane dimethanol; a polyol having 4 or more functional groups such as pentaerythritol or sorbitol; may be used as long as they do not undermine the effects of the present invention. In addition, two or more of the short-chain diols and the short-chain triols may be mixed to use.

The polyurethane elastomer of the present invention may be produced using the polyester polyol (A), the polyisocyanate compound (B) and the mixture (C) of the short-chain diol and the short-chain triol. The composition ratio equal to (total amount of hydroxyl group in the polyester polyol (A) and the mixture (C) of the short-chain diol and the short-chain triol)/(amount of isocyanate group in the polyisocyanate compound (B)) is preferably 1/0.8 to 1.1.

A well-known polyurethane production method such as a prepolymer method or one-shot method may be used for the reaction of polyurethane. In the present invention, the prepolymer method is preferable in terms of obtaining a polyurethane having excellent strength and abrasion resistance.

It is necessary for the polyurethane elastomer of the present invention to contain more than 80% by weight of polyester polyol in the polyurethane elastomer, because if the content of the polyester polyol is less than 80% by weight, a polyurethane elastomer having excellent rebound resilience at a low temperature cannot be obtained.

In the present invention, polyols other than the polyester polyol (A) may be used as long as they do not undermine the effects of the present invention, and the content of the polyester polyol (A) is preferably 100 to 80% by weight.

The polyurethane elastomer composition of the present invention is preferably applicable to various devices and office automation equipments for electrophotographic printing, such as printing machines, facsimile machines or copy machines using an electrophotographic photoreceptor. More specifically, the polyurethane elastomer composition of the present invention is preferably applicable to a cleaning part, an electrically-charging part, a development part or a paper feeding part of various devices and office automation equipment as a rubber member.

EXAMPLE

Example 1

Polyester polyol A (EG/1,4 BG/SebA, EG/1,4BG=60/40 mol %, acid value of 0.3, hydroxyl group value of 56) was obtained by polycondensing ethylene glycol, 1,4-butylene glycol (1,4BG) and adipic acid (AA) in a 2 L four-necked flask.

Next, a prepolymer (NCOeq=551) was produced by reacting the polyester polyol A and MDI in a 2 L four-necked flask, and a polyurethane elastomer sheet with 2 mmT was molded by curing the obtained prepolymer with a cross-linking agent (1,4BG/TMP=70/30 wt %) at a ratio of NCO/OH=1.02. The physical property is shown in Table 1.

Example 2

Example 2 was carried out in the same manner as Example 1, except that polyester polyol B (EG/1,2PG/SebA, EG/1,2PG=80/20 mol %, acid value of 0.3, hydroxyl group value of 56) was used as a polyol. The physical property is shown in Table 1.

Example 3

Example 3 was carried out in the same manner as Example 1, except that polyester polyol C (EG/1,4BG/2 MPD/SebA, EG/1,4BG/2 MPD=60/20/20 mol %, acid value of 0.3, hydroxyl group value of 56) was used as a polyol. The physical property is shown in Table 1.

Example 4

Example 4 was carried out in the same manner as Example 1, except that polyester polyol D (1,4BG/2 MPD/SebA/AA, 1,4BG/2 MPD=80/20 mol %, SebA/AA=65/35 mol %, acid value of 0.3, hydroxyl group value of 56) was used as a polyol. The physical property is shown in Table 2.

Example 5

Example 5 was carried out in the same manner as Example 1, except that polyester polyol E (1,2PG/1,4BG/1,6HG/SebA/AA, 1,2PG/1,4BG/1,6HG=20/40/40 mol %, SebA/AA=50/50 mol %, acid value of 0.3, hydroxyl group value of 56) was used as a polyol. The physical property is shown in Table 2.

Example 6

Example 6 was carried out in the same manner as Example 1, except that polyester polyol F (1,4BG/1,6HG/SebA/AA, 1,4BG/1,6HG=70/30 mol %, SebA/AA=50/50 mol %, acid value of 0.3, hydroxyl group value of 56) was used as a polyol. The physical property is shown in Table 2.

<Abbreviation of Compound>
EG: ethylene glycol
1,2 PG: 1,2-propylene glycol
1,4 BG: 1,4-butylene glycol
1,6 HG: 1,6-hexane diol
2 MPD: 2-methyl-1,3-propane diol
AA: adipic acid
SebA: sebacic acid
MDI: diphenylmethane diisocyanate
TMP: trimethylolpropane Dynamic Viscoelasticity Dynamic viscoelasticity was measured with DMA (Dynamic Mechanical Analyzer: manufactured by Seiko Instruments Inc.)

A temperature dispersion behavior of loss tangent (tan δ=loss elastic modulus/storage elastic modulus) was tracked and the temperature dispersion width was evaluated using the tan δ peak value and the tan δ half-value width.

Temperature Dependency of Rebound Resilience (JISK7312)

Rebound resilience (Rb) at 5° C., 23° C., and 50° C.

100%-Permanent Elongation (PS)

The same test piece as the test piece used in JISK7312 tensile strength at break test was used and the gauge mark lines were kept at 100%-elongation for 10 minutes. Then the change rate of the gauge mark distance was measured as 100%-permanent elongation after releasing the tensile force.

Tensile Strength at Break (TB), Tear Strength (TR)

Tensile strength at break and tear strength were measured in accordance with JISK7312.

Concentration of Ester Group (mmol/g)

Mole number of ester group/weight of polyester polyol

Concentration of Alkyl Group (mmol/g)

Mole number of alkyl group side-chain/weight of polyester polyol

TABLE 1

|  | Example 1 | Example 2 | Example 3 |
| --- | --- | --- | --- |
| Polyester polyol (A) | A | B | C |
| Polyhydric alcohol | EG/1,4BG | EG/1,2PG | EG/1,4BG/2MPD |
| Ratio by mol % | 60/40 | 80/20 | 60/20/20 |
| Polyvalent carboxylic acid | SebA | SebA | SebA |
| Ratio by mol % | 100 | 100 | 100 |
| Number average molecular weight of polyol | 2000 | 2000 | 2000 |
| Concentration of ester group (mmol/g) | 8.04 | 8.37 | 8.04 |
| Concentration of alkyl group (mmol/g) | 0 | 0.94 | 1.81 |
| Polyisocyanate compound (B) | MDI | MDI | MDI |
| Cross-linking agent 1,4 BG/TMP | 7/3 | 7/3 | 7/3 |
| NCO/OH | 1.02 | 1.02 | 1.02 |
| Hardness (JISA) | 72 | 71 | 70 |
| tan δ peak temperature (° C.) | −5.9 | −2.2 | −3.5 |
| tan δ peak value | 0.655 | 0.677 | 0.660 |
| tan δ half-value width (° C.) | 30.7 | 29.7 | 30.3 |
| Rebound resilience (5° C.) | 12 | 11 | 11 |
| Rebound resilience (50° C.) | 52 | 53 | 52 |
| ΔRb (50-5° C.) | 40 | 42 | 41 |
| 100%-permanent elongation | 1.9 | 1.8 | 1.4 |
| TB tensile strength at break (MPa) | 37.9 | 25.4 | 25.1 |
| TR tear strength (kN/m) | 58.4 | 51.5 | 52.1 |

TABLE 2

|  | Example 4 | Example 5 | Example 6 |
| --- | --- | --- | --- |
| Polyester polyol (A) | D | E | F |
| Polyhydric alcohol | 1,4BG/2MPD | 1,2PG/1,4BG/1,6HG | 1,4BG/1,6HG |
| Ratio by mol % | 80/20 | 20/40/40 | 70/30 |
| Polyvalent carboxylic acid | SebA/AA | SebA/AA | SebA/AA |
| Ratio by mol % | 65/35 | 50/50 | 50/50 |
| Number average molecular weight of polyol | 2000 | 2000 | 2000 |
| Concentration of ester group (mmol/g) | 8.07 | 8.03 | 8.03 |
| Concentration of alkyl group (mmol/g) | 0.91 | 0.90 | 0 |
| Polyisocyanate compound (B) | MDI | MDI | MDI |
| Cross-linking agent 1,4 BG/TMP | 7/3 | 7/3 | 7/3 |
| NCO/OH | 1.02 | 1.02 | 1.02 |
| Hardness (JISA) | 71 | 70 | 70 |
| tan δ peak temperature (° C.) | −1.8 | −2.9 | −8.7 |
| tan δ peak value | 0.688 | 0.687 | 0.683 |
| tan δ half-value width (° C.) | 28.8 | 28.8 | 28.9 |
| Rebound resilience (5° C.) | 10 | 10 | 11 |
| Rebound resilience (50° C.) | 54 | 54 | 55 |
| ΔRb (50-5° C.) | 44 | 44 | 44 |
| 100%-permanent elongation | 1.5 | 1.2 | 1.3 |

TABLE 2-continued

|  | Example 4 | Example 5 | Example 6 |
|---|---|---|---|
| TB tensile strength at break (MPa) | 25.1 | 25.5 | 27.3 |
| TR tear strength (kN/m) | 50.9 | 50.2 | 56.3 |

Comparative Example 1

Comparative Example 1 was carried out in the same manner as Example 1, except that polyester polyol G (1,4BG/1,6HG/SebA, 1,4BG/1,6HG=50/50 mol %, acid value of 0.3, hydroxyl group value of 56) was used as a polyol. The physical property is shown in Table 3.

Comparative Example 2

Comparative Example 2 was carried out in the same manner as Example 1, except that polyester polyol H(ND/2 MOD/AA, ND/2 MOD=85/15 mol %, acid value of 0.3, hydroxyl group value of 56) was used as a polyol. The physical property is shown in Table 3.

Comparative Example 3

Comparative Example 3 was carried out in the same manner as Example 1, except that polyester polyol I (ND/2 MOD/SebA, ND/2 MOD=65/35 mol %, acid value of 0.3, hydroxyl group value of 56) was used as a polyol. The physical property is shown in Table 3.

TABLE 3

|  | Comparative Example 4 | Comparative Example 5 | Comparative Example 6 |
|---|---|---|---|
| Polyester polyol (A) | G | H | I |
| Polyhydric alcohol | 1,4BG/1,6HG | ND/2MOD | ND/2MOD |
| Ratio by mol % | 50/50 | 85/15 | 65/35 |
| Polyvalent carboxylic acid | SebA | AA | SebA |
| Ratio by mol % | 100 | 100 | 100 |
| Number average molecular weight of polyol | 2000 | 2000 | 2000 |
| Concentration of ester group (mmol/g) | 7.01 | 6.80 | 5.63 |
| Concentration of alkyl group (mmol/g) | 0 | 0.59 | 1.16 |
| Polyisocyanate compound (B) | MDI | MDI | MDI |
| Cross-linking agent 1,4 BG/TMP | 7/3 | 7/3 | 7/3 |
| NCO/OH | 1.02 | 1.02 | 1.02 |
| Hardness (JISA) | 72 | 71 | 70 |
| tan δ peak temperature (° C.) | −3.5 | 3.2 | −0.1 |
| tan δ peak value | 0.552 | 0.579 | 0.545 |
| tan δ half-value width (° C.) | 35.6 | 34.1 | 38.8 |
| Rebound resilience (5° C.) | 14 | 11 | 12 |
| Rebound resilience (50° C.) | 55 | 51 | 52 |
| ΔRb (50-5° C.) | 41 | 40 | 40 |
| 100%-permanent elongation | 3.7 | 3.2 | 3.0 |
| TB tensile strength at break (MPa) | 18.9 | 18.6 | 16.3 |
| TR tear strength (kN/m) | 52.2 | 48.9 | 44.5 |

Each of the polyurethane elastomers obtained in Examples showed excellent 100%-permanent elongation of 1.2 to 1.9, while keeping tan δ half-value width of 28° C. or more. In contrast, in the polyurethane elastomers obtained in Comparative Examples, although tan δ half-value width is 30° C. or more and the temperature dispersion width is broad, 100%-permanent elongation was 3 to 3.7, which is large. Therefore, the polyurethane elastomers obtained in Examples are able to reduce the variation of rebound resilience caused by external environment and have durability under a long period elongation condition.

INDUSTRIAL APPLICABILITY

The present invention is properly applicable to an electrophotographic printing member having a reduced temperature dependency and both long-term durability and mechanical strength.

The invention claimed is:

1. A polyurethane elastomer composition for electrophotographic printing comprising:
   a polyester polyol (A) obtained by polycondensing a polyvalent carboxylic acid (A-1) containing sebacic acid as a main component and a polyhydric alcohol ((A-2) selected from the following (I) to (III):
   (I) a linear glycol having 2 to 4 carbon atoms,
   (II) a linear glycol having 2 to 4 carbon atoms and a glycol having 2 to 4 carbon atoms with an alkyl side chain,
   (III) a linear glycol having 2 to 4 carbon atoms and 1,6-hexane diol;
   a polyisocyanate compound (B); and
   a mixture (C) of a short-chain diol and a short-chain triol, wherein
   the ester group concentration of the polyester polyol (A) is more than 8 mmol/g.

2. The polyurethane elastomer composition for electrophotographic printing according to claim 1, wherein the polyvalent carboxylic acid (A-1) contains 50 to 100 mol % of sebacic acid and 0 to 50 mol % of adipic acid.

3. The polyurethane elastomer composition for electrophotographic printing according to claim 1, wherein the polyhydric alcohol (A-2) contains 40 to 100 mol % of the linear glycol having 2 to 4 carbon atoms.

4. The polyurethane elastomer composition for electrophotographic printing according to claim 1, wherein the polyhydric alcohol (A-2) contains 20 to 1 mol % of the glycol having 2 to 4 carbon atoms with an alkyl side chain.

5. The polyurethane elastomer composition for electrophotographic printing according to claim 1, wherein the polyhydric alcohol (A-2) contains 30 to 1 mol % of 1,6-hexanediol.

6. The polyurethane elastomer composition for electrophotographic printing according to claim 1, wherein the number average molecular weight of the polyester polyol (A) is 1500 to 3000.

7. An electrophotographic printing member produced by using the polyurethane elastomer composition for electrophotographic printing according to claim 1.

8. An electrophotographic printing member produced by using the polyurethane elastomer composition for electrophotographic printing according to claim 2.

9. An electrophotographic printing member produced by using the polyurethane elastomer composition for electrophotographic printing according to claim 3.

10. An electrophotographic printing member produced by using the polyurethane elastomer composition for electrophotographic printing according to claim 4.

11. The polyurethane elastomer composition for electrophotographic printing according to claim 1, wherein the polyester polyol (A) is obtained by polycondensing the polyvalent carboxylic acid (A-1) containing sebacic acid as a main component and the polyhydric alcohol (A-2) including (II) and (III).

12. The polyurethane elastomer composition for electrophotographic printing according to claim 1, wherein the linear glycol having 2 to 4 carbon atoms in (I), (II), and (III) is at least one selected from the group consisting of ethylene glycol, 1,3-propylene glycol, and 1,4-butane dial.

13. The polyurethane elastomer composition for electrophotographic printing according to claim 1, wherein the glycol having 2 to 4 carbon atoms with an alkyl side chain in (II) is an aliphatic glycol with an alkyl side chain having 1 to 2 carbon atoms.

14. The polyurethane elastomer composition for electrophotographic printing according to claim 13, wherein the aliphatic glycol with an alkyl side chain having 1 to 2 carbon atoms is at least one selected from the group consisting of 1,2-propylene glycol and 2-methyl-1,3-propane diol.

* * * * *